United States Patent
Henry et al.

(10) Patent No.: US 8,372,195 B2
(45) Date of Patent: Feb. 12, 2013

(54) SOLID PIGMENT CONCENTRATES

(75) Inventors: Steven Henry, Lancashire (GB); Roger Francis Graham Brown, Lancashire (GB)

(73) Assignee: Akzo Nobel Coatings International B.V., Arnhem (NL)

( * ) Notice: Subject to any disclaimer, the term of this patent is extended or adjusted under 35 U.S.C. 154(b) by 0 days.

(21) Appl. No.: 12/089,359

(22) PCT Filed: Oct. 3, 2006

(86) PCT No.: PCT/EP2006/066986
§ 371 (c)(1),
(2), (4) Date: Apr. 4, 2008

(87) PCT Pub. No.: WO2007/039604
PCT Pub. Date: Apr. 12, 2007

(65) Prior Publication Data
US 2008/0214730 A1    Sep. 4, 2008

(30) Foreign Application Priority Data
Oct. 4, 2005  (EP) .................... 05109207

(51) Int. Cl.
*C09C 3/08* (2006.01)
*C09C 7/00* (2006.01)
*C08K 5/101* (2006.01)

(52) U.S. Cl. .............. 106/504; 106/505; 8/527

(58) Field of Classification Search ...... 106/31.01–31.9, 106/400–506
See application file for complete search history.

(56) References Cited

U.S. PATENT DOCUMENTS

| | | | |
|---|---|---|---|
| 3,728,301 A | | 4/1973 | Spence et al. |
| 4,155,773 A | * | 5/1979 | Ferrill, Jr. ............... 106/413 |
| 4,224,212 A | | 9/1980 | Topham |
| 4,244,863 A | * | 1/1981 | Hemmerich et al. ...... 523/334 |
| 4,962,150 A | * | 10/1990 | Allen ........................ 524/602 |
| 5,252,103 A | * | 10/1993 | Kamata et al. .............. 8/554 |
| 6,053,438 A | * | 4/2000 | Romano et al. ............ 241/16 |
| 6,111,054 A | | 8/2000 | Haubennestel et al. |
| 6,527,845 B1 | * | 3/2003 | Tsuchiya et al. ......... 106/31.88 |
| 7,198,668 B2 | * | 4/2007 | Reisacher et al. ......... 106/499 |
| 2005/0004284 A1 | | 1/2005 | Koenemann et al. |
| 2005/0090609 A1 | * | 4/2005 | Reisacher et al. ......... 524/612 |

FOREIGN PATENT DOCUMENTS

| | | |
|---|---|---|
| EP | 0 121 308 | 10/1984 |
| EP | 0 292 702 | 11/1988 |
| EP | 0 311 209 | 4/1989 |
| EP | 0 893 155 | 1/1999 |
| EP | 1 109 678 | 6/2001 |
| JP | 05320533 A  * | 12/1993 |
| WO | WO 00/24503 | 5/2000 |
| WO | WO 01/21298 | 3/2001 |
| WO | WO 02/072639 | 9/2002 |
| WO | WO 02/085507 | 10/2002 |
| WO | WO 03/048223 | 6/2003 |
| WO | WO 03/064540 | 8/2003 |
| WO | WO 2005/056639 | 6/2005 |

OTHER PUBLICATIONS

Machine translated English equivalent of JP 3169682 B2 , 5 pages. Note: JP 3169682 is the patent of application publication JP 05320533.*

(Continued)

*Primary Examiner* — Ling Choi
*Assistant Examiner* — Brieann R Fink
(74) *Attorney, Agent, or Firm* — Kenyon & Kenyon LLP (57) ABSTRACT

Solid pigment concentrate comprising at least one pigment and a dispersant comprising a polyamine backbone and one or more hydrophobic pendent groups, characterized in that the concentrate further comprises a non-ionic 5 surface active agent comprising polyoxyalkylene groups. The polyamine backbone can for instance comprise polyalkylene imine building blocks.

12 Claims, 4 Drawing Sheets

PR254 Powder stirred in to water (<C*> = 92.5, <т> = 9.1)

OTHER PUBLICATIONS

Chen (Surface-modifying treatment of organic pigments with ultra-dispersion agents, Textile Auxiliaries, 2007, 24(4), 9 pages).*
CAPlus Abstract of JP 3169682 (AN 1994:411835), 1 page.*
F.K. Farkas, "The Industrial Paint-Making Process," *Paint and Surface Coatings, Theory and Practice*, Chapter 8, 1987.

M. R. Porter, "Use of Surfactant Theory", *Handbook of Surfactants*, Chapter 4, 1994.
International Search Report, PCT International Application No. PCT/EP2006/066986, dated Apr. 20, 2007.

* cited by examiner

Figure 1 – PR254 Powder stirred in to water (<C*> = 92.5, <т> = 9.1)

Figure 2 – PR254 Powder stirred into Shellsol D40 (<C*> = 65.96, <τ> = 5.9)

Figure 3 – PY184 Powder stirred in to water (<C*> = 51.7, <τ> = 3.1)

Figure 4 – PY184 Powder stirred into Shellsol D40 (<C*> = 39.6, <τ> = 7.3)

SOLID PIGMENT CONCENTRATES

FIELD OF INVENTION

The present invention relates to solid pigment concentrates comprising one or more organic or inorganic pigments and one or more types of dispersants. Such pigment concentrates serve to tint paints, lacquers or similar substances. Solid pigment concentrates can be in powder form or in the form of tablets or the like.

BACKGROUND OF INVENTION

When pure pigments are mixed into base paints, dust formation results in loss of pigment material and affects health and safety circumstances. Moreover, after mixing pure pigment into a base paint, the pigment particles tend to stick together and form lumps. The pigments do not disperse properly and do not develop their full colour strength. To overcome this problem colour mixing systems generally make use of pigment pastes, as is the case in the system disclosed in EP-A 0 311 209. The composition of such a pigment paste generally depends on the type of base paint: Pigment pastes for universal application (aqueous as well as solvent borne paints) typically comprise co-solvents, e.g. glycols, water, surfactants, dispersants, and optionally further additives. Pigment pastes solely for use in solvent borne paints typically comprise a substantial content of a polymeric binder, solvents, and additives. In the pastes, the pigments are pre-dispersed and further ground and milled. Such pastes are highly coloured and are filled into containers for distribution.

Colour mixing at points of sale, for instance in a consumer shop, involves the use of a colour mixing apparatus. Such a mixing apparatus typically comprises a carousel of canisters filled with pigment pastes. The pastes are transferred to the canisters from the containers in which they were distributed, ready for use as tinters. Each canister can be positioned above a container with a base paint. The canisters have an opening at their lower side, shut by a shut-off valve. A central processing unit can open the valve and dose the pigment paste gravimetrically or volumetrically into the base paint, in accordance with a formula corresponding to a selected paint colour. Examples of such devices are disclosed in EP-A 1 109 678. The machines are calibrated for each paste. If the viscosity of the paste changes over time, then the calibration of the machine becomes less accurate, leading to inaccurate tinting.

After use, the distribution containers remain contaminated with a small amount of strongly coloured material, making them unsuitable for disposal as conventional waste.

Due to their composition, the pigment pastes are not universally compatible with all types of base paints. If a pigment paste comprises a binder, it may be incompatible with the binder of a base paint. Further, the additives in the pastes, particularly surfactants and dispersants, can have a negative effect on the film properties of the paint after application. The solvent or co-solvent content of the pigment pastes increases the volatile organic content of the mixed paint. Moreover, since the pigment pastes also comprise non-colorant materials, the colour strength of the pigments is diluted.

It has been attempted to overcome these problems by using solid pigment concentrates, e.g., in the form of tablets such as in EP-A 0 121 308, or granulates, such as in WO 03/064540. In practice, these concentrates are found to be more suitable for water borne base paints than for solvent borne base paints and the colour strength remains a critical factor.

U.S. Pat. No. 6,111,054 discloses solid pigment concentrates with polyamine dispersants obtainable by the reaction of organic acids with polyamines. The disclosed dispersants are amphiphilic dispersants. The organic acids in one pendent side group comprise water-compatible blocks, such as polyethers, and hydrophobic solvent-compatible blocks, such as polycaprolactone. Drawbacks are the inferior dispersibility and the lower colour strength obtained from pigment compositions prepared from such dispersants.

SUMMARY OF INVENTION

The object of the invention is to provide a pigment concentrate which can be stirred easily and rapidly into base paints based on solvents as well as into water borne base paints, while retaining satisfactory colour strength.

DETAILED DESCRIPTION:

The object of the invention is achieved by providing a solid pigment concentrate comprising at least one pigment and a dispersant comprising a polyamine backbone and one or more hydrophobic pendent groups, characterized in that the concentrate further comprises a non-ionic surface-active agent comprising polyoxyalkylene groups, e.g., polyoxyethylene groups.

Polyamine backbones show good adherence to most types of organic or inorganic pigments. Particularly good results are obtained if at least a part of the polyamine backbone of the dispersant comprises polyalkylene imine building blocks, e.g., polyethylene imine building blocks.

In this respect, dispersant tails are considered to be hydrophobic if these tails, as such, do not dissolve in water but are readily soluble in hydrocarbon solvents, such as low aromatic white spirit or de-aromatized white spirit. Non-ionic groups with substantially no ether groups are considered to be hydrophobic. The hydrophobic tails can, e.g., be polyester, or polyalkylene groups or any other type of non-ionic tail. Polyester tails can for instance be derived from hydroxyl-functional carboxylic acids, such as hydroxy stearic acid, or ring-openable cyclic esters, such as caprolactone, or mixtures of diacids or acid anhydrides and diols, such as hexahydrophthalic acid or phthalic anhydride and hexane diol.

The hydrophobic tails can be covalently linked to the polyalkylene imine backbone via amide groups. Alternatively, they can be linked to the backbone by a salt link between an amine group on the backbone and a carboxylic acid end group of the polyester tail. The degree of covalent amide linkage can be anywhere between 0-100%.

The weight ratio of the polyamine backbone to the hydrophobic tails can for example be in the range of 1:1 to 1:10.

Surprisingly good results in aqueous systems are obtained if the dispersant is present in an excess amount exceeding the minimum amount required to effectively disperse the pigment. This minimum can for example be determined by the Daniel Flow Point test. The Daniel Flow Point is the minimum amount of dispersant needed to completely cover the surfaces of the pigment particles in the dispersion. It is discussed for example in Chapter 8 of *Paint and Surface Coatings: Theory and Practice*, edited by R. Lambourne, published in 1987 by Ellis Horwood of Chichester, England (page 312). Generally, the dispersant is present in an excess amount if it exceeds a content of 2 mg/m$^2$ of BET surface of pigment present.

Non-ionic compounds with hydrophilic and hydrophobic groups, such as dispersants, can be characterized by their hydrophilic—lipophilic balance, or HLB value, as discussed for example in Chapter 4 of *Handbook of Surfactants* by M. R. Porter, published in 1994 (2$^{nd}$ Edition) by Chapman & Hall of Glasgow, Scotland (page 73). The dispersant can for instance have a HLB value in the range of 6-18.

The dispersant can for example have a number average molecular weight Mn between 600-40,000 g/mol, e.g., between 1,200-30,000 g/mol.

The polyamine dispersant resin can suitably be prepared by reacting at least one di- or polyamine and at least one compound having at least one amine-reactive group and a pendent hydrophobic group.

As suitable di- or polyamines aliphatic amines may be mentioned. These aliphatic amines can contain at least three primary, secondary, and/or tertiary amine groups. Aliphatic linear polyamines comprising primary and secondary amino groups may be used, such as diethylene triamine (DETA), triethylene tetramine (TETA), tetraethylene pentamine (TEPA), pentaethylene hexamine, hexaethylene heptamine, and higher homologues. Aliphatic branched polyamines can also be used, particularly (C$_2$-C$_4$)-alkylene amines, which comprise primary, secondary, and tertiary amino groups and have number average molecular weights of 600-2,000,000 g/mol, such as the Lupasol® types produced by BASF or the Epomin® types produced by Nippon Shokubai. These branched aliphatic polyamines, which are also known as polyimines or polyaziridines, are produced by known methods, e.g. by the polymerization of ethylene imine. Examples of these aliphatic branched polyamines are types with an average Mn of about 600-3,000 g/mol, such as types with an average Mn of about 600-2,500 g/mol.

Suitable compounds having at least one amine-reactive group and a pendent hydrophobic group include acid-terminated hydrophobic groups, the reaction product of at least one compound having at least two isocyanate groups with a long chain alcohol, or mixtures thereof.

Examples of acid-terminated hydrophobic groups include acid-terminated polyesters such as those obtainable by the polymerization of a lactone (e.g. propiolactone, valerolactone, caprolactone) or the condensation of hydroxy-carboxylic acids (e.g. 12-hydroxy stearic acid). The acid groups provide the reaction with the amine groups of the polyamine backbone by forming a salt, an amide, or a combination thereof.

Examples of the reaction product of at least one compound having at least two isocyanate groups with a long chain alcohol include the above-mentioned diisocyanates reacted with long chain alcohols.

Optionally, the polyamine dispersant may have pendent hydrophilic groups. Compounds suitable to introduce such groups can be obtained by the reaction of at least one compound having at least two isocyanate groups with a polyalkylene oxide based group having at least one isocyanate-reactive group. The polyalkylene oxide based group having at least one isocyanate-reactive group may be selected from polyalkylene glycol monoalkyl ether and polyoxyalkylene monoamine. Examples of suitable alkylene oxides are ethylene oxide, propylene oxide, and butylene oxide. The polyalkylene oxide based side groups can for example be based on ethylene oxide or propylene oxide or mixtures thereof.

The polyalkylene oxide based group which can for example have at least one isocyanate-reactive group is a compound according to formula (I) or (II), or a mixture thereof, wherein R$^1$ is selected from C$_1$ to C$_4$ alkyl groups, n is 0 to 25, m is 1 to 50, and n+m≦50. It is to be understood that the (C$_3$H$_6$O) and (C$_2$H$_4$O) units may be present in the compound as blocks of polypropylene oxide and polyethylene oxide or as a more or less random mixture of propylene oxide and ethylene oxide derived units.

Examples of suitable amines according to formula (I) are polyoxyalkylene monoamines, which are commercially available from Huntsman under the trade designation Jeffamine® M.

Examples of suitable ethers according to formula (II) are polyalkylene oxide based alkoxy compounds, which are commercially available from Clariant under the trade designation Polyglykol M.

Examples of compounds having at least two isocyanate groups include 1,6-diisocyanatohexane, isophorone diisocyanate, 2,4-toluene diisocyanate, 2,6-toluene diisocyanate, diphenyl methane-diisocyanate, 4,4'-bis(isocyanato-cyclohexyl)methane, 1,4-diisocyanatobutane, 1,5-diisocyanato-2,2-dimethyl pentane, 2,2,4-trimethyl-1,6-diisocyanatohexane, 1,10-diisocyanatodecane, 4,4-diisocyanato-cyclohexane, 2,4-hexahydrotoluene diisocyanate, 2,6-hexahydrotoluene diisocyanate, norbornane diisocyanate, 1,3-xylene diisocyanate, 1,4-xylene diisocyanate, 1-isocyanato-3-(isocyanato methyl)-1-methyl cyclohexane, m-α, α-α',α'-tetramethyl xylylene diisocyanate, and mixtures thereof.

In the preparation of the polyamine dispersant resin the amount of compounds having hydrophobic groups is selected such as to ensure that the content of the hydrophobic group in the polyamine dispersant resin is at least 20 weight-%, calculated on the weight of both hydrophilic and hydrophobic groups. The amount of hydrophobic group in the polyamine dispersant resin can for example exceed 60 weight-%. The polyamine dispersant resin can comprise at least two, e.g., at least three pendent hydrophobic based side groups per molecule.

A commercially available example of a dispersant suitable for use in a pigment concentrate according to the invention is Solsperse® 13940, available from Noveon, though this is supplied as a solution in organic solvent and for the purpose of this invention needs to be stripped of solvent and emulsified in water.

The pigment concentrates according to the present invention can comprise organic and/or inorganic pigments. The organic pigments are typically organic chromatic and black pigments. Inorganic pigments can likewise be chromatic, black, and/or white pigments, but also effect pigments, such as metallic pigments, pearlescent pigments, interference pigments, multi-colour pigments, and the inorganic pigments typically used as fillers.

Examples of suitable organic colour pigments include monoazo pigments, such as C.I. Pigment Brown 25; C.I. Pigment Orange 5, 13, 36, 38, 64, 67, and 74; C.I. Pigment Red 1, 2, 3, 4, 5, 8, 9, 12, 17, 22, 23, 31, 48:1, 48:2, 48:3, 48:4, 49, 49:1, 51:1, 52:1, 52:2, 53, 53:1, 53:3, 57:1, 58:2, 58:4, 63, 112, 146, 148, 170, 175, 184, 185, 187, 191:1, 208, 210, 245, 247, and 251; C.I. Pigment Yellow 1, 3, 62, 65, 73, 74, 97, 120, 151, 154, 168, 181, 183, and 191; C.I. Pigment Violet 32; diazo pigments, such as C.I. Pigment Orange 16, 34, 44, and 72; C.I. Pigment Yellow 12, 13, 14, 16, 17, 81, 83, 106, 113, 126, 127, 155, 170, 174, 176, 180, and 188; diazo condensation pigments, such as C.I. Pigment Yellow 93, 95, and 128; C.I. Pigment Red 144, 166, 214, 220, 221, 242, and 262; C.I. Pigment Brown 23 and 41; anthanthrone pigments, such as C.I. Pigment Red 168; anthraquinone pigments, such as C.I. Pigment Yellow 147, 177, and 199; C.I. Pigment Violet 31; anthrapyrimidine pigments, such as C.I. Pigment Yellow 108; quinacridone pigments, such as Pigment Orange 48 and 49; C.I. Pigment Red 122, 202, 206 and 209; C.I. Pigment Violet 19; quinophthalone pigments, such as C.I. Pigment Yellow 138; diketopyrrolopyrrole pigments, such as C.I. Pigment Orange 71, 73, and 81; C.I. Pigment Red 254, 255, 264, 270, and 272; dioxazine pigments, such as C.I. Pigment Violet 23 and 37; C.I. Pigment Blue 80; flavanthrone pigments, such as C.I. Pigment Yellow 24; indanthrone pigments, such as C.I. Pigment Blue 60 and 64; isoindoline pigments, such as C.I. Pigments Orange 61 and 69; C.I. Pigment Red 260; C.I. Pigment Yellow 139 and 185; isoindolinone pigments, such as C.I. Pigment Yellow 109, 110, and 173; isoviolanthrone pigments, such as C.I. Pigment Violet 31; metal complex pigments, such as C.I. Pigment Red 257; C.I. Pigment Yellow 117, 129, 150, 153, and 177; C.I. Pigment Green 8; perinone pigments, such as C.I. Pigment Orange 43; C.I. Pigment Red 194; perylene pigments, such as C.I. Pigment Black 31 and 32; C.I. Pigment Red 123, 149, 178, 179, 190, and 224; C.I. Pigment Violet 29; phthalocyanine pigments, such as C.I. Pigment Blue 15, 15:1, 15:2, 15:3, 15:4, 15:6, and 16; C.I. Pigment Green 7 and 36; pyranthrone pigments, such as C.I. Pigment Orange 51; C.I. Pigment Red 216; pyrazoloquinazolone pigments, such as C.I. Pigment Orange 67; C.I. Pigment Red 251; thioindigo pigments, such as C.I. Pigment Red 88 and 181; C.I. Pigment Violet 38; triarylcarbonium pigments, such as C.I. Pigment Blue 1, 61, and 62; C.I. Pigment Green 1; C.I. Pigment Red 81, 81:1, and 169; C.I. Pigment Violet 1, 2, 3, and 27; C.I. Pigment Black 1 (aniline black); C.I. Pigment Yellow 101 (aldazine yellow); C.I. Pigment Brown 22.

Examples of suitable inorganic colour pigments are white pigments, such as titanium dioxide (C.I. Pigment White 6), zinc white, pigment grade zinc oxide; zinc sulfide, lithopone; black pigments such as iron oxide black (C.I. Pigment Black 11), iron manganese black, spinel black (C.I. Pigment Black 27); carbon black (C.I. Pigment Black 7); and chromatic pigments, such as chromium oxide, chromium oxide hydrate green; chrome green (C.I. Pigment Green 48); cobalt green (C.I. Pigment Green 50); ultramarine green; cobalt blue (C.I. Pigment Blue 28 and 36; C.I. Pigment Blue 72); ultramarine blue; manganese blue; ultramarine violet; cobalt violet; manganese violet; red iron oxide (C.I. Pigment Red 101); cadmium sulfoselenide (C.I. Pigment Red 108); cerium sulfide (C.I. Pigment Red 265); molybdate red (C.I. Pigment Red 104); ultramarine red; brown iron oxide (C.I. Pigment Brown 6 and 7), mixed brown, spinel phases and corundum phases (C.I. Pigment Brown 29, 31, 33, 34, 35, 37, 39, and 40), chromium titanium yellow (C.I. Pigment Brown 24), chrome orange; cerium sulfide (C.I. Pigment Orange 75); yellow iron oxide (C.I. Pigment Yellow 42); nickel titanium yellow (C.I. Pigment Yellow 53; C.I. Pigment Yellow 157, 158, 159, 160, 161, 162, 163, 164, and 189); spinel phases (C.I. Pigment Yellow 119); cadmium sulfide and cadmium zinc sulfide (C.I. Pigment Yellow 37 and 35); chrome yellow (C.I. Pigment Yellow 34); bismuth vanadate (C.I. Pigment Yellow 184).

Examples of inorganic pigments typically used as fillers are transparent silicon dioxide, ground quartz, aluminium oxide, aluminium hydroxide, natural micas, natural and precipitated chalk, and barium sulfate.

The concentrates of the present invention can also comprise effect pigments or luster pigments. These are platelet-shaped mono- or multi-layer pigments showing visual effects marked by the interplay of interference, reflection, and absorption phenomena. Examples are aluminium platelets and aluminium, iron oxide, and mica platelets bearing one or more coats, especially of metal oxides.

The pigment particles within the preparation can be present in finely divided form, which means that the average particle size is within the range of 50 nm to 5,000 nm. The average particle size may for example be at least 80 nm, e.g., at least 100 nm. It is preferable that the average particle size is at most 3,000 nm, e.g., at most 1,500 nm, for example at most 1,000 nm.

The surface-active agent in the pigment preparations of the present invention can include at least one nonionic surface-active additive based on polyethers. The polyethers are in particular polyalkylene oxides or reaction products of alkylene oxides with alcohols, amines, aliphatic carboxylic acids or aliphatic carboxamides. For the purposes of the present invention, the term "alkylene oxide" is to also encompass aryl-substituted alkylene oxide, especially phenyl-substituted ethylene oxide.

Mixed as well as unmixed polyalkylene oxides, for example $C_2$-$C_4$-alkylene oxides and phenyl-substituted $C_2$-$C_4$-alkylene oxides, especially polyethylene oxides, polypropylene oxides, and poly(phenylethylene oxide)s, in particular alkylene oxide block copolymers, but also random copolymers of these alkylene oxides are useful.

Particularly suitable are block copolymers having polypropylene oxide and polyethylene oxide blocks or else poly(phenyl ethylene oxide) and polyethylene oxide blocks. They, like the unmixed polyalkylene oxides, are obtainable by polyaddition of the alkylene oxides to starter compounds, such as to saturated or unsaturated aliphatic and aromatic alcohols, saturated or unsaturated aliphatic and aromatic amines, and saturated or unsaturated aliphatic carboxylic acids and carboxamides. When ethylene oxide and propylene oxide are used, these starter compounds can be reacted first with ethylene oxide and then with propylene oxide or first with propylene oxide and then with ethylene oxide. It is customary to use from 1 to 300 mol. e.g., from 3 to 150 mol of alkylene oxide per mol of starter molecule.

Suitable aliphatic alcohols in general contain from 6 to 26 carbon atoms, e.g., from 8 to 18 carbon atoms and can have an unbranched, branched or cyclic structure. Examples are octanol, nonanol, decanol, isodecanol, undecanol, dodecanol, 2-butyloctanol, tridecanol, isotridecanol, tetradecanol, pentadecanol, hexadecanol, 2-hexyldecanol, heptadecanol, octadecanol, 2-heptylundecanol, 2-octyldecanol, 2-nonyltridecanol, 2-decyltetradecanol, oleyl alcohol and 9-octadecenol, and also mixtures of these alcohols, such as C8/C10, C13/C15, and C16/$C_{1-8}$ alcohols, and cyclopentanol and cyclohexanol. Of particular interest are the saturated and unsaturated fatty alcohols obtained from natural raw materials by fat hydrolysis and reduction and the synthetic fatty alcohols from the oxo process. The alkylene oxide adducts with these alcohols typically have average molecular weights Mn from 200 to 5,000, in particular from 400 to 2,000.

Examples of the above-mentioned aromatic alcohols include not only alpha- and beta-naphthol and their $C_1$-$C_4$-alkyl derivatives, but also in particular phenol and its $C_1$-$C_{12}$-alkyl derivatives, such as hexyl phenol, heptyl phenol, octyl phenol, nonyl phenol, isononyl phenol, undecyl phenol, dodecyl phenol, di- and tributyl phenol, and dinonyl phenol.

Suitable aliphatic amines correspond to the above-mentioned aliphatic alcohols. Again of particular importance here are saturated and unsaturated fatty amines, which can for example have from 6 to 20 carbon atoms. Examples of suitable aromatic amines are aniline and its derivatives.

Useful aliphatic carboxylic acids include especially saturated and unsaturated fatty acids, which can for example contain from 12 to 20 carbon atoms, and fully hydrogenated, partially hydrogenated, and unhydrogenated resin acids and also polyfunctional carboxylic acids, for example dicarboxylic acids, such as maleic acid.

Suitable carboxamides are derived from these carboxylic acids.

As well as the alkylene oxide adducts with these monofunctional amines and alcohols, it is the alkylene oxide adducts with at least bifunctional amines and alcohols which are of very particular interest.

The at least bifunctional amines can for example have from two to five amine groups and conform in particular to the formula $H_2N$—$(R$—$NR1)n$—$H$ (R: $C_2$-$C_6$-alkylene; R1: hydrogen or $C_1$-$C_6$-alkyl; n: 1-5). Specific examples are: ethylene diamine, diethylene triamine, triethylene tetramine, tetraethylene pentamine, 1,3-propylene-diamine, dipropylene triamine, 3-amino-1-ethylene aminopropane, hexamethylene diamine, dihexamethylene triamine, 1,6-bis(3-amino-propylamino)hexane, and N-methyl dipropylene triamine, of which hexamethylene diamine and diethylene triamine and ethylene diamine are particularly suitable examples.

These amines can for example be reacted first with propylene oxide and then with ethylene oxide. The ethylene oxide content of the block copolymers typically is about 10-90 weight-%.

The block copolymers based on polyamines generally have average molecular weights Mn from 600 to 40,000, e.g., from 1,200 to 30,000.

The at least bifunctional alcohols can for example have from two to five hydroxyl groups. Examples are $C_2$-$C_6$-alkylene glycols and the corresponding di- and polyalkylene glycols, such as ethylene glycol, 1,2-propylene glycol, 1,3-propylene glycol, 1,2-butylene glycol, 1,4-butylene glycol, 1,6-hexylene glycol, dipropylene glycol, and polyethylene glycol, glycerol, and pentaerythritol, of which ethylene glycol, polyethylene glycol and propylene glycol and dipropylene glycol are particularly suitable examples.

Suitable alkylene oxide adducts with at least bifunctional alcohols have a central polypropylene oxide block, i.e. are based on a propylene glycol or polypropylene glycol which is initially reacted with further propylene oxide and then with ethylene oxide. The ethylene oxide content of the block copolymers typically is in the range from 10 to 90 weight-%.

The block copolymers based on polyhydric alcohols generally have number average molecular weights Mn from 400 to 20,000, e.g., from 1,000 to 15,000.

Such alkylene oxide block copolymers are known and commercially available, for example under the names Tetronic® and Pluronic® (BASF).

Alkylene oxide block copolymers are selected with different hydrophilic-lipophilic balance (HLB) values, depending on the application medium in which the pigment preparations of the present invention are to be used.

Commercially available examples of surface-active agents particularly suitable for use in a pigment concentrate according to the present invention are oleyl amide ethoxylates such as Bermodol® SPS 2543 or coco amide ethoxylates such as Bermodol® SPS 2525 (both Akzo Nobel Chemicals B.V.).

Optionally, the weight ratio of dispersant to polyether surfactant is between 3:1 and 1:3. Good results are obtained if the dispersant content is about as high as the surfactant content.

The pigment concentrate can have a pigment content of 60% by total weight or more. Optionally, the dispersant content in the pigment concentrate may be in the range of 2-30% by total weight. The surfactant content can for example also be in the range of 2-30% by total weight.

The pigment preparation may further comprise other ingredients, additives or auxiliaries commonly used in pigment preparations, such as wetting agents, anti-foaming agents, heat stabilizers, light stabilizers, antioxidants, and other pigment dispersion aids and/or surfactants.

The pigment concentrate according to the present invention can for example be in the form of a powder, a tablet, granules or any other suitable shape. If the pigment concentrate is in powder form, the average particle size, measured by laser diffraction, can be, e.g., between 2-50 µm, but it can also be made smaller or larger if so desired.

The present invention also provides a method for mixing a paint of a selected colour by providing a set of base paints and a set of pigment concentrates as described above, the concentrates being of a different colour. The method includes the steps of selecting a base paint and one or more pigment concentrates and mixing the selected pigment concentrations into the base paint in amounts in accordance with a formula corresponding to the selected colour.

The invention further relates to a process for the preparation of a pigment preparation comprising the steps of
 a) stirring a pigment, a dispersant resin, a non-ionic surface active agent comprising polyoxyalkylene groups optionally with added water or organic diluent, to form a fluidized pigment slurry,
 b) optionally, milling the slurry, and
 c) drying the slurry,
wherein the dispersant resin comprises a polyamine backbone and one or more hydrophobic pendent groups.

As mentioned above in respect of the pigment preparation, the pigment used in the process can be an organic or an inorganic pigment. It is also possible to use a mixture of pigments, for example a mixture of two or more inorganic pigments, a mixture of two or more organic pigments, or a mixture of inorganic and organic pigments. It is possible to use a large variety of pigments in the process. The pigments can be introduced into the process as standard dried pigments. The milling step serves to break up the agglomerates and to achieve the required pigment particle size. Organic pigments are also available as so-called press cakes. Organic pigments, when synthesized, are in the form of very small crystals, called primary particles. The aim of pigment synthesis is to produce primary particles of a size that optimizes pigment application properties such as colour strength, tone and brightness, transparency and opacity, and flow properties. The press cake contains the pigment essentially in this disaggregated form. During drying of the pigment press cake, primary particles join together to form aggregates and agglomerates. Hence, less energy is required to break up the agglomerates and achieve the required pigment particle size. Therefore, when an organic pigment is used in the process, it is possible and preferred to use it in the form of a pigment press cake. When pigment press cakes are used, simple stirring of the fluidized pigment slurry may be sufficient to achieve the required pigment particle size. Milling of the slurry may be redundant in such cases.

When additional liquid is required to fluidize the mixture of pigment and dispersant resin, it is preferred that the liquid is water. Instead of or in addition to water, organic solvents may be used, such as glycols or glycol ethers, for example ethylene glycol or higher homologues thereof or ethylene glycol mono-n-butyl ether.

The optional milling step can be carried out using well-known milling equipment usually employed for breaking down the particle size of pigments. Examples of suitable equipment for carrying out the process are bead mills, jet mills, ultrasonic mills, basket mills, roll mills, and high-speed dissolvers. Milling is generally continued until the average particle size is within the range of 50 nm to 5,000 nm. Optionally, the average particle size is at least 80 nm, e.g., at least 100 nm. The average particle size can for example be at most 3,000 nm, e.g., at most 1,500 nm, e.g., at most 1,000 nm.

Examples of suitable methods of drying are spray granulation and fluidized bed drying, spray-drying, drying in a paddle dryer, evaporation and subsequent comminution, and freeze-drying. The selected method of drying may influence the particle size of the pigment preparations of the present invention. The drying step can be carried out by freeze-drying or by spray-drying.

Spray and fluidized bed granulation may produce coarsely divided granules having average particle sizes from 50 to 5,000 µm and especially from 100 to 1,000 µm. Spray-drying typically produces granules having average particle sizes <20 µm. Depending on the process conditions, spray-drying may also produce finely divided pigment preparations. Finely divided preparations are also obtainable by drying in a paddle dryer and by evaporation with subsequent grinding.

The residual moisture content of the dried pigment preparation obtained generally is less than 2 weight-%.

The pigment concentrates according to the present invention show excellent colour properties, especially with regard to colour strength, brilliance, hue, and hiding power, and especially for their stir-in characteristics, i.e. they can be dispersed in application media with a minimal input of energy, simply by stirring or shaking. The pigment concentrates of the present invention have a high pigment content and exhibit very good stability in storage.

The pigment preparations of the present invention are very useful for pigmenting, e.g., paints, lacquers or inorganic coatings. These paints can be purely water borne, comprise mixtures of water and organic solvents, for example alcohols, or be based exclusively on organic solvents, such as alcohols, glycol ethers, ketones, e.g. methylethyl ketone, amides, e.g. N-methylpyrrolidone and dimethyl formamide, esters, e.g. ethyl acetate, butyl acetate, and methoxypropyl acetate, or aromatic or aliphatic hydrocarbons, e.g. xylene, mineral oil, and mineral spirits.

Examples of materials which can be pigmented with the pigment concentrates of the present invention include coatings, for example architectural coatings, industrial coatings, automotive coatings, radiation-curable coatings; paints, including paints for building exteriors and building interiors, for example wood paints, lime washes, distempers, emulsion paints; building materials (water is typically added only after the building material and the pigment preparation have been dry-mixed), for example cement, concrete, mortar, gypsum; bitumen, caulks, etc.

The pigment concentrates of the present invention are particularly useful as mixing components in colour-mixing or -matching systems. Owing to their stir-in characteristics, they can be used directly as a solid for this purpose. If desired, however, they may also be first converted into base colours, mixing varnishes and tinting colours (especially into colours having a high solids content, "HS colours"), or even more highly pigmented tinting pastes, which then constitute the components of the mixing system. The matching of the desired hue and hence the mixing of the colour components can be effected visually via a system of colour cards in a very large number of hue gradations based on colour standards, such as RAL, BS and NCS, or preferably under computer control, whereby an unlimited number of hues become accessible ("computer colour matching").

The invention is further elucidated by the following examples.

The invention is further elucidated by the following examples:

EXAMPLE 1

A pigment concentrate was prepared using Irgazin® Red 2030 (ex Ciba), a diketo-pyrrolo-pyrrole pigment with colour index classification Pigment Red 254. A dispersant was used which consisted of 1 equivalent of polyethylene imine modified with 3 equivalents of polyhydroxy stearic acid, where approx. 50% of the polyhydroxy stearic acid is covalently bound to the polyethylene imine via amide bonds. The material was used as notionally 100% active material.

Further, an oleyl-amide-ethoxylate with a mean number of 4 oxyethylene units per molecule and HLB of 8.8 was used as a surface-active agent. The material was used as a 90% active mixture with water.

The dispersant was emulsified in water by gentle heating and agitation to give a turbid liquid containing approx. 7.75% by weight of dispersant. The pigment was added to give a pigment load of approx. 34%, also corresponding to 15% by weight of dispersant on pigment, and mixed in using a high-speed disperser. The pigment was milled using multiple passes of a bead mill until a Hegman Fineness of Grind of <20 µm was achieved. A recorded quantity of dispersed pigment paste was obtained and the surfactant was added to this under low-speed stirring until a quantity of 15% by weight of active material on pigment was achieved. The final paste had a pigment content of approx. 32% by weight and an overall non-volatile content of approx. 41.6% by weight. The paste was diluted to a non-volatile content of approx. 30% by weight and spray-dried. The resultant powder contained approx. 77% by weight of pigment, approx. 11.5% by weight of dispersant and surfactant, respectively, corresponding to 15% by weight, respectively, of dispersant and surfactant on pigment.

The powder was added to the base paints shown in Table 1 and mixed in by shaking the can for 2 minutes. In order to evaluate the colour strength obtained, a comparison was made with commercially available pigment pastes containing CI Pigment Red 254, at an equivalent pigment addition level on base paint.

TABLE 1

Base paints

| | |
|---|---|
| Rubbol ® AZ | High gloss solvent borne alkyd trim paint with 2 wt % water pre-shaken in |
| Rubbol ® AZ HS | Reduced VOC high gloss solvent borne alkyd trim paint with 2 wt % water pre-shaken in |

TABLE 1-continued

Base paints

| | |
|---|---|
| Rubbol ® Satin | Satin solvent borne alkyd trim paint with 2 wt % water pre-shaken in |
| Rubbol ® Satura | Satin solvent borne urethane-alkyd trim paint with 2 wt % water pre-shaken in |
| Epolan ® Alkyd Golv 80 | Solvent borne urethane-alkyd floor paint with 2 wt % water pre-shaken in |
| Powerkote ® | Pliolite based masonry paint with 2 wt % water pre-shaken in |
| Rubbol ® BL Azura | High gloss water borne alkyd emulsion trim paint adjusted to pH 9.5 with ammonia |
| Rubbol ® BL Satura | Satin water borne alkyd emulsion trim paint adjusted to pH 9.5 with ammonia |
| Alphatex ® IQ | Low sheen acrylic wall paint, adjusted to pH 9.5 with ammonia |

Drawdowns were made of paints which had been mixed by shaking the can for 2 minutes and these were left to dry. The colour was measured using a spectrophotometer and L*a*b* values according to the CIE Lab system, and chroma (C*) and hue (h°) values according to the CIE LCh system are shown in Table 2 for the powder concentrates of the Example and in Table 3 for pastes. For the solvent borne paints, the solvent borne paste Acotint® sR2 was used. For the water borne paints, the water borne paste Acomix® wR2 was used. Acotint® sR2 and Acomix® wR2 are commercially available from Akzo Nobel Coatings, Sassenheim, the Netherlands.

TABLE 2

Pigment Red 254 Powder

| | L* | a* | b* | C* | h° |
|---|---|---|---|---|---|
| Rubbol ® AZ | 64.06 | 43.34 | 9.24 | 44.32 | 12.04 |
| Rubbol ® AZ HS | 66.97 | 38.66 | 6.55 | 39.21 | 9.61 |
| Rubbol ® Satin | 65.11 | 41.31 | 7.79 | 42.04 | 10.68 |
| Rubbol ® Satura | 64.62 | 41.67 | 8.52 | 42.53 | 11.56 |
| Epolan ® Alkyd Golv 80 | 62.85 | 43.17 | 10.31 | 44.38 | 13.43 |
| Powerkote ® | 57.68 | 49.06 | 14.03 | 51.02 | 15.95 |
| Rubbol ® BL Azura | 63.60 | 43.33 | 8.87 | 44.23 | 11.57 |
| Rubbol ® BL Satura | 63.51 | 44.16 | 9.73 | 45.22 | 12.43 |
| Alphatex ® IQ | 62.37 | 44.58 | 10.64 | 45.83 | 13.42 |

TABLE 3

Pigment Red 254 Pastes

| | L* | a* | b* | C* | h° |
|---|---|---|---|---|---|
| Rubbol ® AZ | 65.94 | 39.81 | 7.31 | 40.48 | 10.41 |
| Rubbol ® AZ HS | 69.30 | 34.88 | 4.59 | 35.18 | 7.49 |
| Rubbol ® Satin | 66.32 | 38.80 | 6.64 | 39.37 | 9.71 |
| Rubbol ® Satura | 65.71 | 39.50 | 7.15 | 40.14 | 10.25 |
| Epolan ® Alkyd Golv | 63.63 | 42.01 | 9.64 | 43.10 | 12.93 |
| Powerkote ® | 58.05 | 47.66 | 12.80 | 49.35 | 15.03 |
| Rubbol ® BL Azura | 63.74 | 42.99 | 8.46 | 43.82 | 11.13 |
| Rubbol ® BL Satura | 64.20 | 42.69 | 8.90 | 43.61 | 11.78 |
| Alphatex ® IQ | 63.51 | 42.57 | 9.73 | 43.67 | 12.88 |

Taking the C* (chroma) value as an indication of the depth of shade achieved, it can be seen for each respective paint that the shade achieved was at least as deep as that obtained from an equivalent quantity of pigment supplied in the form of a commercially available paste.

Figure 1:
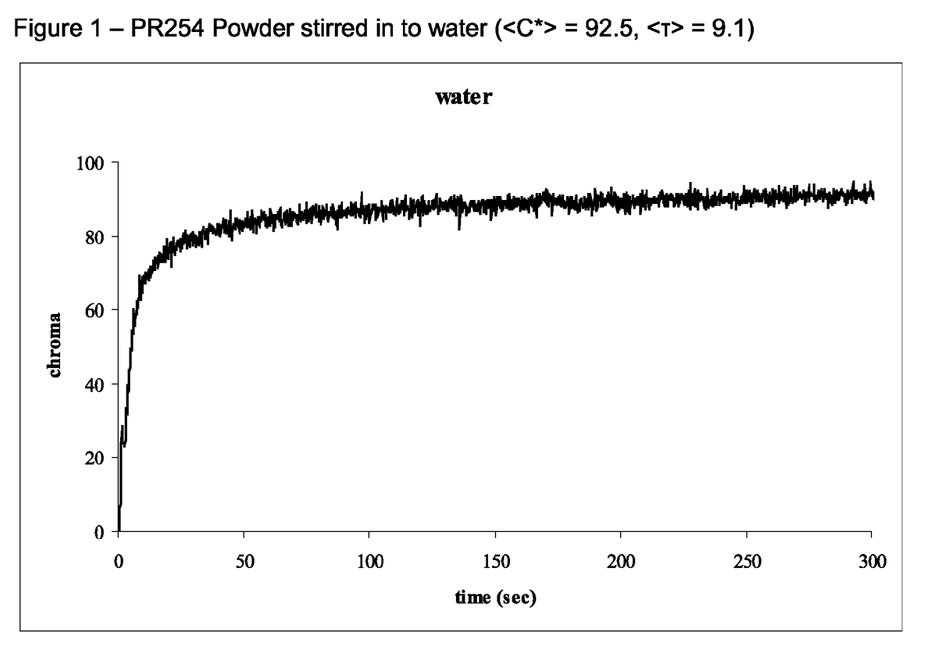
FIG. 1 shows a graph of the measurement of the development of color strength for Pigment Red 254 (PR254) powder stirred into water.
Figure 2:
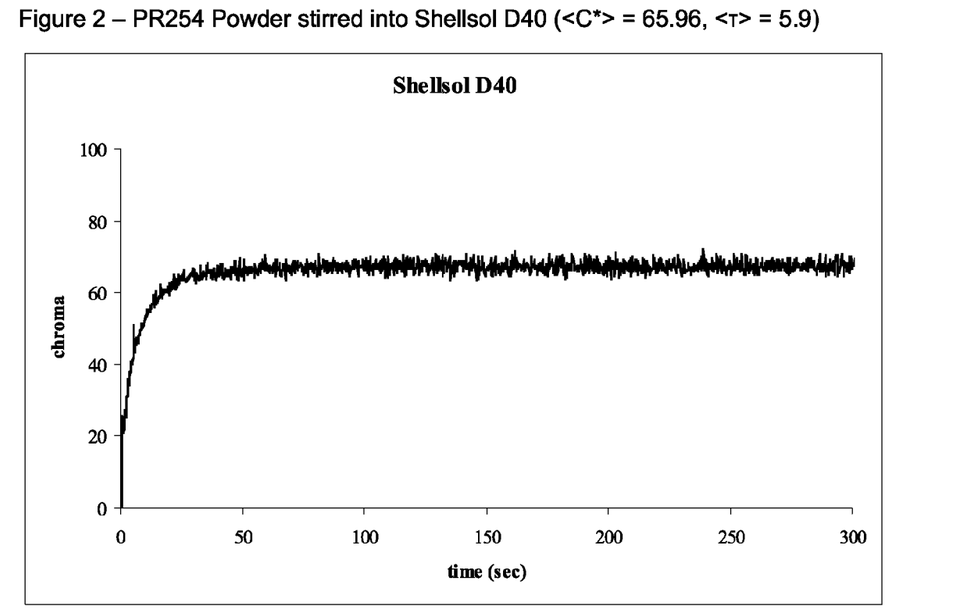
FIG. 2 shows a graph of the measurement of the development of color strength for Pigment Red 254 (PR254) powder stirred into Shellsol D40.

The development of the colour strength was measured after the pigment concentrate was added to water and to a solvent, respectively. The measurements were performed with a fibre-optic spectrophotometer in combination with a flow cell. Based on the measurements the chroma was calculated according to the CIE LCh standard as a function of time. The results are shown in FIG. 1 for colour strength development in water and in FIG. 2 for colour strength development in a solvent, Shelsol® D40. As shown by the results in these figures, the colour strength reaches its maximum in 30-40 seconds. A satisfactory colour strength is obtained, in solvent as well as in water.

EXAMPLE 2

A pigment concentrate was prepared using Sicopal® Yellow L1150 (ex. BASF), a bismuth vanadate pigment with colour index classification Pigment Yellow 184. The same dispersant was used as described in Example 1.

Further, the same oleyl-amide-ethoxylate material was used as described in Example 1.

The dispersant was emulsified in water by gentle heating and agitation to give a turbid liquid containing approx. 12.25% by weight of dispersant. The pigment was added to give a pigment load of approx. 55%, also corresponding to 10% by weight of dispersant on pigment, and mixed in using a high-speed disperser. The pigment was milled using multiple passes of a bead mill until a Hegman Fineness of Grind of <20 µm was achieved. A recorded quantity of dispersed pigment paste was obtained and the surfactant was added to this under low-speed stirring until a quantity of 10% by weight of active material on pigment was achieved. The final paste had a pigment content of approx. 51.8% by weight and an overall non-volatile content of approx. 62.2% by weight. The paste was diluted to a non-volatile content of approx. 20% by weight and spray-dried. The resultant powder contained approx. 83.4% by weight of pigment, approx. 8.3% by weight of dispersant and surfactant, respectively, corresponding to 10% by weight, respectively, of dispersant and surfactant on pigment.

The powder was added to the base paints already shown in Table 1 and mixed in by shaking the can for 2 minutes. In order to evaluate the colour strength obtained, a comparison was made with commercially available pigment pastes containing CI Pigment Yellow 184, at an equivalent pigment addition level on base paint.

Drawdowns were made of paints which had been mixed by shaking the can for 2 minutes and these were left to dry. The colour was measured using a spectrophotometer and L*a*b* values according to the CIE Lab system and chroma (C*) and hue (h°) values according to the CIE LCh system are shown in Table 4 for the powder concentrates of the Example and in Table 5 for pastes. For the solvent borne paints, the solvent borne paste Acotint® sY3 was used. For the water borne paints, the water borne paste Acomix® wY3 was used. Acotint® sY3 and Acomix® wY3 are commercially available from Akzo Nobel Coatings, Sassenheim, the Netherlands.

TABLE 4

Pigment Yellow 184 Powder

| | L* | a* | b* | C* | h° |
|---|---|---|---|---|---|
| Rubbol ® AZ | 93.81 | −8.75 | 39.91 | 40.86 | 102.37 |
| Rubbol ® AZ HS | 93.61 | −8.54 | 35.17 | 36.20 | 103.65 |
| Rubbol ® Satin | 93.83 | −8.39 | 38.33 | 39.24 | 102.35 |
| Rubbol ® Satura | 93.59 | −8.78 | 39.49 | 40.45 | 102.54 |

TABLE 4-continued

Pigment Yellow 184 Powder

|  | L* | a* | b* | C* | h° |
|---|---|---|---|---|---|
| Epolan ® Alkyd Golv 80 | 92.56 | −8.60 | 43.67 | 44.51 | 101.15 |
| Powerkote ® | 92.75 | −10.20 | 53.20 | 54.17 | 100.85 |
| Rubbol ® BL Azura | 93.88 | −7.52 | 38.77 | 39.49 | 100.98 |
| Rubbol ® BL Satura | 95.39 | −9.28 | 40.35 | 41.40 | 102.95 |
| Alphatex ® IQ | 94.23 | −9.77 | 43.77 | 44.85 | 102.59 |

TABLE 5

Pigment Yellow 184 Commercial Pastes

|  | L* | a* | b* | C* | h° |
|---|---|---|---|---|---|
| Rubbol ® AZ | 94.46 | −9.97 | 40.35 | 41.56 | 103.88 |
| Rubbol ® AZ HS | 94.36 | −9.47 | 34.13 | 35.42 | 105.51 |
| Rubbol ® Satin | 94.22 | −9.67 | 39.94 | 41.10 | 103.62 |
| Rubbol ® Satura | 94.02 | −10.28 | 41.06 | 42.33 | 104.06 |
| Epolan ® Alkyd Golv | 93.06 | −10.06 | 45.79 | 46.88 | 102.39 |
| Powerkote ® | 92.71 | −10.53 | 52.69 | 53.73 | 101.30 |
| Rubbol ® BL Azura | 94.17 | −8.49 | 39.53 | 40.43 | 102.12 |
| Rubbol ® BL Satura | 95.28 | −9.61 | 41.32 | 42.42 | 103.09 |
| Alphatex ® IQ | 94.18 | −9.78 | 43.00 | 44.10 | 102.82 |

Taking the C* (chroma) value as an indication of the depth of shade achieved, it can be seen for each respective paint that the shade achieved was of comparable depth to that obtained from an equivalent quantity of pigment supplied in the form of a commercially available paste.

Figure 3:
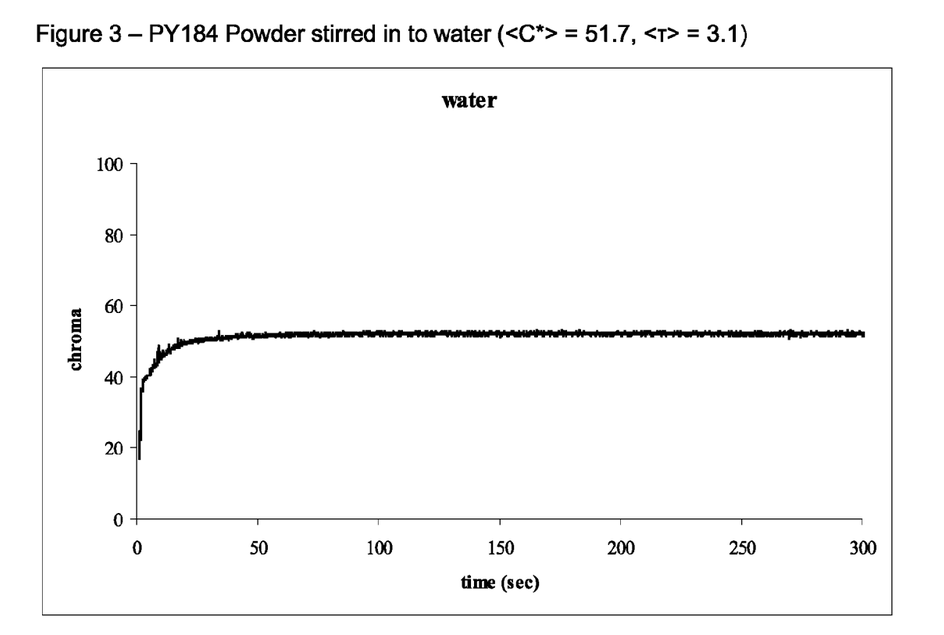
FIG. 3 shows a graph of the measurement of the development of color strength for Pigment Yellow 184 (PY184) powder stirred into water.
Figure 4:
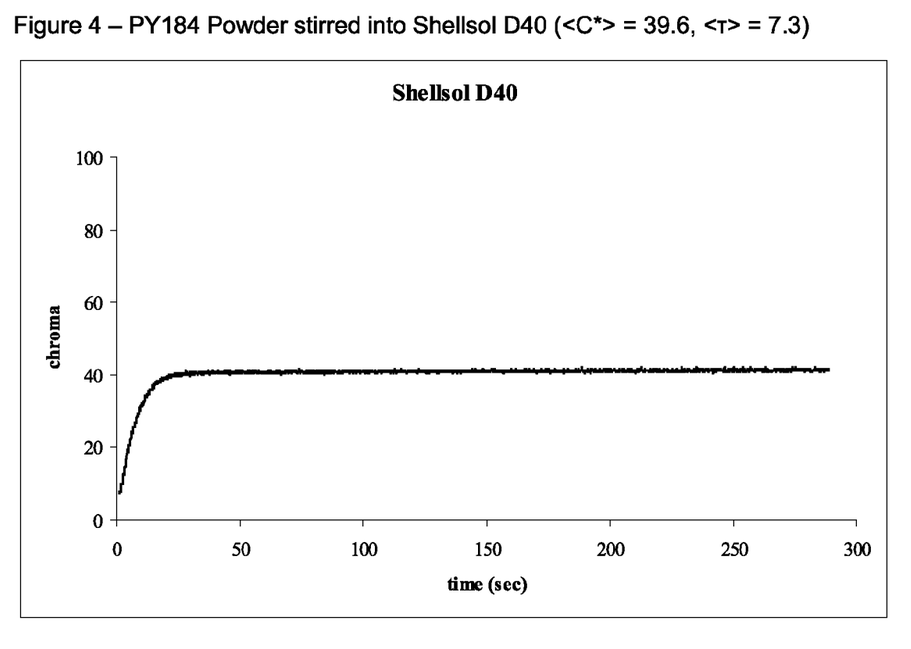
FIG. 4 shows a graph of the measurement of the development of color strength for Pigment Yellow 184 (PY184) powder stirred into Shellsol D40.

The development of colour strength was measured after the pigment concentrate was added to water and to a solvent, respectively. The measurements were performed with a fibre-optic spectrophotometer in combination with a flow cell. Based on the measurements the chroma was calculated according to the CIE LCh standard as a function of time. The results are shown in FIG. 3 for colour strength development in water and in FIG. 4 for colour strength development in a solvent, Shelsol® D40. As shown by the results in these figures, the colour strength reaches its maximum in 30-40 seconds. A satisfactory colour strength is obtained, in solvent as well as in water.

The invention claimed is:
1. A solid pigment concentrate in the form of a powder, granules, or tablet, having a moisture content of less than 2% by weight, comprising:
   at least one pigment;
   a dispersant comprising a polyamine backbone and one or more hydrophobic pendent groups; and
   a non-ionic surface active agent comprising polyoxyalkylene groups, said non-ionic surface active agent being selected from oleyl amide ethoxylates and coco amide ethoxylates;
   wherein the pigment content is at least 60% by total weight, the dispersant content is from 2-30% by total weight, and the content of the surface active agent is from 2-30% by total weight, and wherein the weight ratio of the dispersant to said non-ionic surface active agent is between 3:1 and 1:3.
2. The pigment concentrate according to claim 1, characterized in that at least a part of the polyamine backbone of the dispersant comprises polyalkylene imine building blocks.
3. The pigment concentrate according to claim 1, characterized in that at least a part of the one or more hydrophobic pendent groups is polyester.
4. The pigment concentrate according to claim 3, characterized in that at least a part of the one or more hydrophobic pendent groups comprises building blocks derived from hydroxyl-functional carboxylic acids.
5. The pigment concentrate according to claim 4, characterized in that at least a part of the one or more hydrophobic pendent groups is made of hydroxy stearic acid.
6. The pigment concentrate according to claim 2, characterized in that at least a part of the one or more hydrophobic pendent groups is linked to the polyalkylene imine building blocks via amide groups.
7. The pigment concentrate according to claim 1, characterized in that the weight ratio of the polyamine backbone to the one or more hydrophobic pendent groups is in the range of 1:1 to 1:10.
8. The pigment concentrate according to claim 1, characterized in that the dispersant is present in an excess amount relative to the minimum amount required to effectively disperse the pigment.
9. The pigment concentrate according to claim 5, wherein the weight ratio of the polyamine backbone to the one or more hydrophobic pendent groups is in the range of 1:1 to 1:10.
10. The pigment concentrate according to claim 5, wherein the dispersant is present in an excess amount relative to the minimum amount required to effectively disperse the pigment.
11. The pigment concentrate according to claim 1, wherein the non-ionic surface active agent is an oleyl amide ethoxylate.
12. The pigment concentrate according to claim 1 in the form of a powder having an average particle size, measured by laser diffraction, of between 2-50 μm.

* * * * *